United States Patent
Dandekar et al.

(10) Patent No.: US 7,617,214 B2
(45) Date of Patent: Nov. 10, 2009

(54) PORTING SECURITY APPLICATION PREFERENCES FROM ONE SYSTEM TO ANOTHER

(75) Inventors: Shree A. Dandekar, Round Rock, TX (US); Roger Borchers, Austin, TX (US); Abhinav Gupta, Austin, TX (US); Olga Lyudovyk, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 346 days.

(21) Appl. No.: 11/344,286

(22) Filed: Jan. 31, 2006

(65) Prior Publication Data

US 2007/0192322 A1 Aug. 16, 2007

(51) Int. Cl.
*G06F 17/30* (2006.01)

(52) U.S. Cl. .............................. 707/9; 707/10; 715/700; 713/201; 705/27

(58) Field of Classification Search ........................ None
See application file for complete search history.

(56) References Cited

U.S. PATENT DOCUMENTS

| | | |
|---|---|---|
| 6,834,351 B1 * | 12/2004 | Kabenjian ..................... 726/9 |
| 7,313,575 B2 * | 12/2007 | Carr et al. ................. 707/104.1 |
| 2002/0059425 A1 * | 5/2002 | Belfiore et al. ............... 709/226 |
| 2003/0088653 A1 * | 5/2003 | Wilks .......................... 709/223 |
| 2003/0225631 A1 | 12/2003 | Howell, Jr. et al. |
| 2004/0098607 A1 * | 5/2004 | Alagna et al. ................ 713/200 |
| 2004/0123138 A1 * | 6/2004 | Le Saint ...................... 713/201 |
| 2005/0172229 A1 * | 8/2005 | Reno et al. ................... 715/700 |
| 2005/0172280 A1 * | 8/2005 | Ziegler et al. ............... 717/168 |
| 2005/0192817 A1 * | 9/2005 | Sorenson et al. ............... 705/1 |
| 2005/0267981 A1 * | 12/2005 | Brumley et al. ............. 709/232 |
| 2006/0123415 A1 * | 6/2006 | Dandekar et al. ............ 717/177 |

* cited by examiner

*Primary Examiner*—Khanh B Pham
*Assistant Examiner*—Andalib F Lodhi
(74) *Attorney, Agent, or Firm*—Haynes and Boone, LLP

(57) ABSTRACT

Configuring a security application includes determining whether user preferences for the security application are pre-loaded in an information handling system (IHS) received by a user. If the user preferences have not been pre-loaded a request to receive the user preferences corresponding to the user and the security application is sent to a provider of the security application. The request includes a unique identifier for accessing the user preferences for the security application. The user preferences, which have been previously configured by the user for another IHS, are stored in a predefined format and are accessible to any requester providing the unique identifier. The provider provides the user preferences corresponding to the unique identifier.

15 Claims, 5 Drawing Sheets

```xml
<firewallExecutableRule>
    <executableName>iexplore.exe</executableName>
    <executableVersion>6.1.0.3</executableVersion>
    <execuableSHA1>e343mbyeoy846t0734ivf8t5mj7i9gkegtf84k6tuih95</executableSHA1>
</firewallExecutableRule>
<firewallExecutableRule>
    <executableName>iexplore.exe</executableName>
    <executableVersion>6.1.0.3</executableVersion>
    <executeableSHA1>94kgye056mgycr439tmgyc9rctsd53896h94htr8ymft6</executableSHA1>
</firewallExecutableRule>
```
FIREWALL RECORD 510

```xml
<URLRule>
    <URL>www.naughty.com</URL>
    <URLBlockedAccount>Child</URLBlockedAccount>
    <URLBlockedAccount>Teenager</URLBlockedAccount>
</URLRule>
<spamRule>
    <eMailAddress alwaysBlock=yes>spammer@hotmail.com</emailAddress>
</spamRule>
<spamRule>
    <eMailAddress alwaysBlock=yes>spammer@aol.com</emailAddress>
<spamRule>
```
URL RECORD 520

FIG. 5

PORTING SECURITY APPLICATION PREFERENCES FROM ONE SYSTEM TO ANOTHER

BACKGROUND

The present disclosure relates to build to order systems, and more particularly to improving portability of security application settings between information handling systems.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, entertainment, and/or global communications. In addition, information handling systems may include a variety of hardware and software components that may be configured to process, store, and communicate information and may include one or more computer systems, data storage systems, and networking systems.

It has become a standard practice to deploy one or more security applications to protect vital information stored on a computer and reduce the risk of a cyber attack with an increased occurrence of attacks from viruses, worms, Trojans, junk and/or spam e-mails, spyware, phishing, pop-ups, and hackers exploiting vulnerabilities in computer systems and/or operating procedures. Well known examples of security applications may include virus protection software, firewalls (hardware/software), anti-spam software, junk e-mail filters, authentication programs, parental controls for managing access and usage, and personal account management software to manage passwords, login account numbers and similar others. Some commercially available security applications may be bundled or packaged as a security application suite containing one or more security applications such as anti-virus software, anti-spamware and anti-spyware program.

Each security application is typically configured by a user, e.g., customized, to achieve desired goals such as protecting vital/personal information. The configuration process typically includes defining or selecting configurable attributes, properties, parameters and/or settings of the security application to match user preferences. For example, a user may configure a list of approved/blocked e-mail addresses and junk/spam e-mail filter settings for an anti-spam program.

Presently, there are no tools and/or techniques to share user preferences between one computer system and another and/or between disparate security applications, e.g., between a brand 'A' anti-virus program and a brand 'B' anti-virus program. As a result, the user may experience a duplication of effort by having to manually re-enter security preferences for each computer system and/or security application. The reluctance of many users to re-enter security preferences may result in an increase in the vulnerability of computer systems to security threats on networks such as the Internet. To maintain cost and efficiency, many manufacturers of information handling systems may typically load a default setting for the security preferences, however, many of such settings may not match the user preferences.

Therefore, a need exists to facilitate sharing of security preference information between information handling systems and/or between multiple and often disparate security applications. More specifically, a need exists to develop tools and techniques for re-using user preference information to automatically configure security applications in an information handling system. Accordingly, it would be desirable to provide for efficiently configuring security applications included in an IHS, absent the disadvantages found in the prior methods discussed above.

SUMMARY

The foregoing need is addressed by the teachings of the present disclosure, which relates to configuring user preferences for security applications. Accordingly, one embodiment includes determining whether user preferences for the security application are pre-loaded in an information handling system (IHS) received by a user. If the user preferences have not been pre-loaded a request to receive the user preferences corresponding to the user and the security application is sent to a provider of the security application. The request includes a unique identifier for accessing the user preferences for the security application. The user preferences, which have been previously configured by the user for another IHS, are stored in a predefined format and are accessible to any requester providing the unique identifier. The provider provides the user preferences corresponding to the unique identifier.

Several advantages are achieved according to the illustrative embodiments presented herein. The embodiments advantageously provide improved productivity, lower costs and higher efficiency by providing a structure and/or a framework for sharing user preferences of security applications across multiple information handling systems and across disparate security applications. Thus, the user can request a manufacturer of an information handling system to pre-load the previously saved preferred user settings for a security application, thereby improving the security of the IHS and improving user experience.

BRIEF DESCRIPTION OF THE DRAWINGS

FIG. 5 illustrates an exemplary extensible markup language (XML) source code for storing user preferences in a record, according to an embodiment.

DETAILED DESCRIPTION

Figure 1:
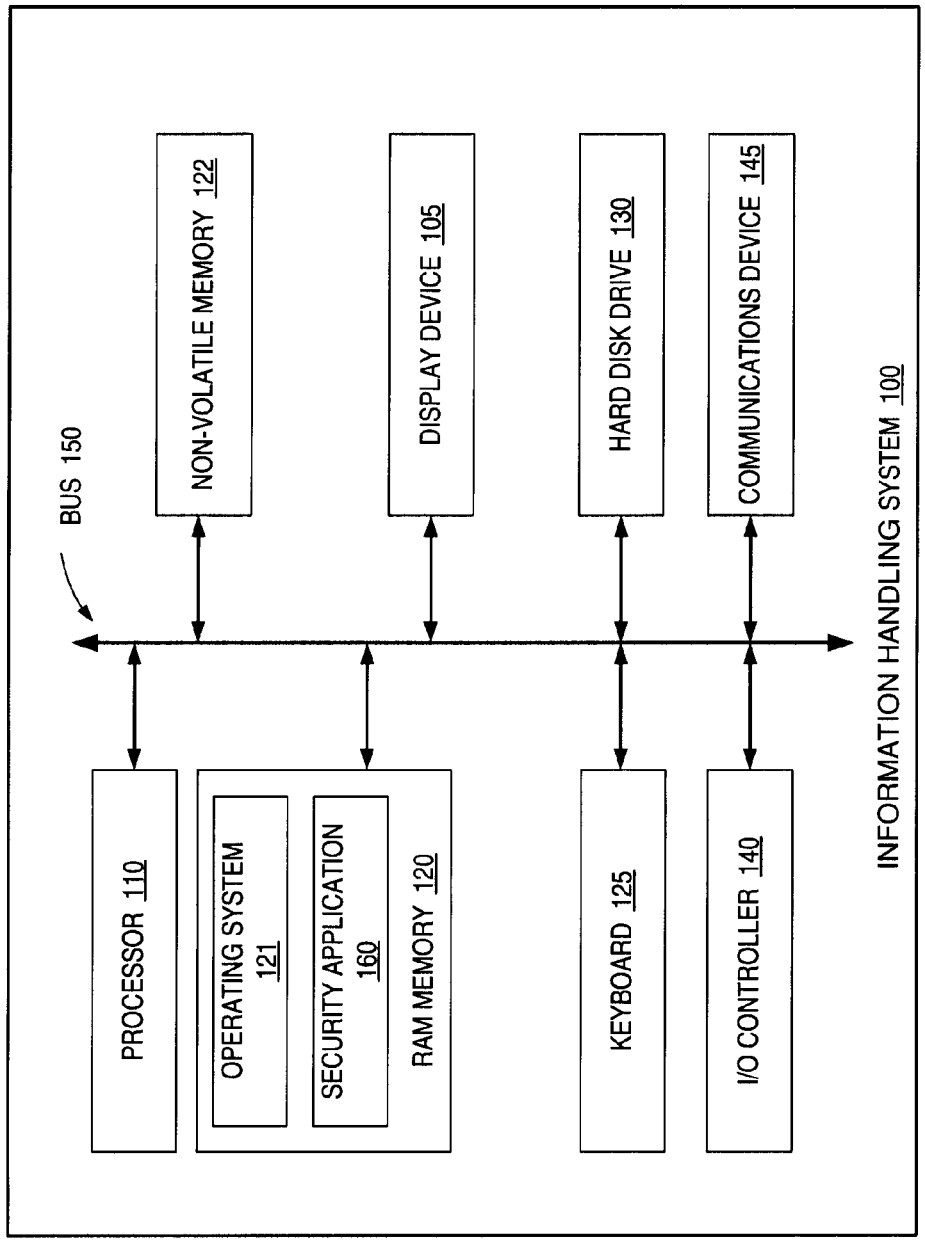
FIG. 1 illustrates a block diagram of an information handling system, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described earlier, due to non-availability of tools and techniques to share user preferences for a security application, a user has to manually re-enter security preferences for each computer system and/or security application. There is a need for an improved method and system to facilitate sharing of security preference information between information handling systems and/or between multiple and often disparate security applications. According to one embodiment, a method and system for configuring a security application includes determining whether user preferences for the security application are pre-loaded in an information handling system (IHS) received by a user. If the user preferences have not been pre-loaded a request to receive the user preferences corresponding to the user and the security application is sent to a provider of the security application. The request includes a unique identifier for accessing the user preferences for the security application. The user preferences, which have been previously configured by the user for another IHS, are stored in a predefined format and are accessible to any requester providing the unique identifier. The provider provides the user preferences corresponding to the unique identifier.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The information handling system may include random access memory (RAM), one or more processing resources such as central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to receive/transmit communications between the various hardware components.

FIG. 1 illustrates a block diagram of an information handling system 100, according to an embodiment. The information handling system (IHS) 100 includes a processor 110, a system random access memory (RAM) 120 (also referred to as main memory), a non-volatile ROM 122 memory, a display device 105, a keyboard 125 and an I/O controller 140 for controlling various other input/output devices. For example, the I/O controller 140 may include a keyboard controller, a cursor device controller and/or the serial I/O controller. It should be understood that the term "information handling system" is intended to encompass any device having a processor that executes instructions from a memory medium. In a particular embodiment, the IHS 100 is used to implement an improved configuration of a security application 160.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. A communications device 145, such as a network interface card and/or a radio device, may be connected to the bus 150 to enable wired and/or wireless information exchange between the IHS 100 and other devices and/or systems (not shown), including the Internet.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) 121 of the IHS 100 is a type of software program that controls execution of other software programs, referred to as application software programs. The security application 160 is an example of an application software program. In a particular embodiment, the RAM 120 stores at least one program to implement one or more methods for configuring the security application. Additional details of the methods are described with reference to FIGS. 2 and 3. In various embodiments the instructions and/or software programs may be implemented in various ways, including procedure-based techniques, component-based techniques, and/or object-oriented techniques, among others. Specific examples include assembler, C, an extensible markup language (XML), C++ objects, Java and Microsoft's .NET technology.

Figure 2:
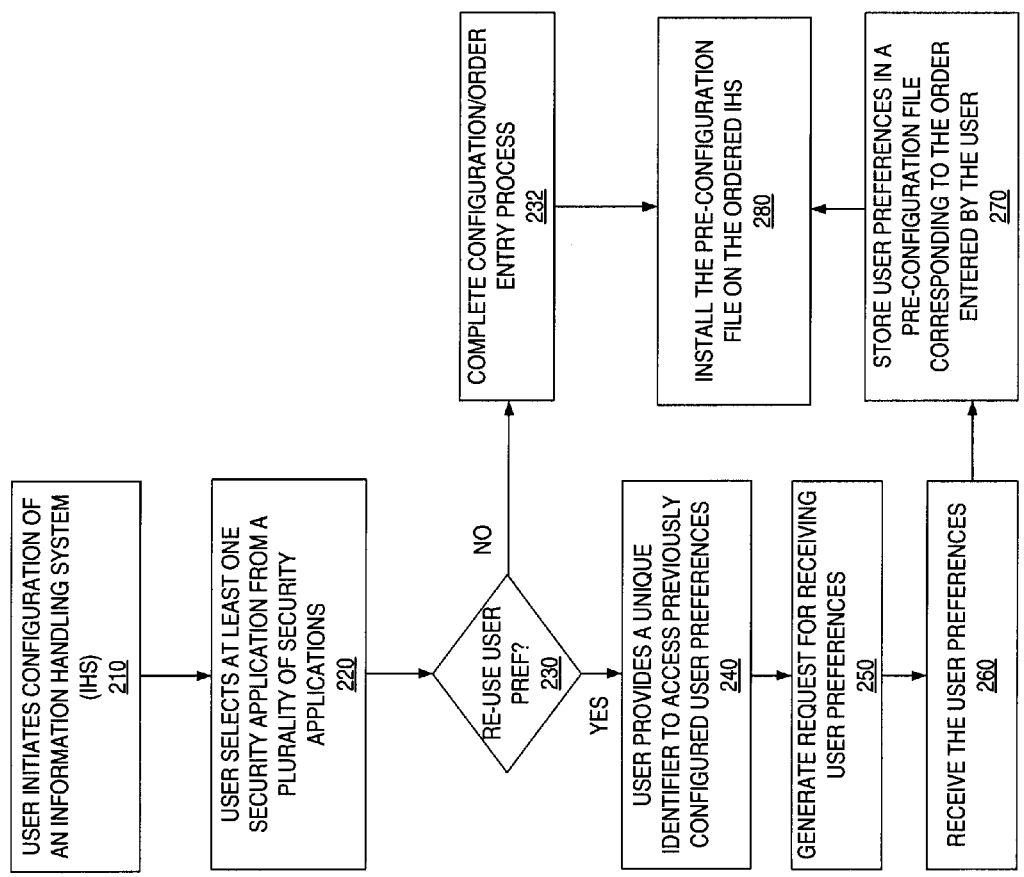
FIG. 2 is a flow chart illustrating a method for configuring a security application during fabrication of an information handling system, according to an embodiment.

FIG. 2 is a flow chart illustrating a method for configuring a security application during fabrication of an information handling system, according to an embodiment. In a particular embodiment, the security application is the same as the security application 160 described with reference to FIG. 1. In step 210, a user initiates configuration of the information handling system, such as the IHS 100. The user may initiate the configuration process by using an on-line, interactive display screen of a configuration and/or an order entry program. In an embodiment, the user may use a telephone to initiate the configuration process.

As a part of the configuration process the user may provide registration and customization information to facilitate the configuration/order entry process. A pre-configuration file corresponding to an order entered by the user may include the registration and customization information. Examples of registration information provided by the user may include Internet provider services subscribed to by the user. For example, if a user has an existing Internet provider, the information relating to the Internet provider may be added to the IHS system configuration. When the system is ordered and subsequently received by the user all of the desired user preferences and settings may be advantageously loaded onto the system upon startup. Examples of customization information that may be customized by the user include pre-configuration of application programs, screen appearance, display options, and similar others. In this manner upon starting up the IHS 100 system, the user settings are automatically loaded, including the desired screen presentation and the program options.

In step 220, the user selects at least one security application from a plurality of security applications. In a particular embodiment, the user selection is received as a first input from the user. As described earlier, the plurality of security application may include virus protection software, firewalls (hardware/software), anti-spam software, junk e-mail filters, authentication programs, parental controls for managing access and usage, and personal account management software to manage passwords, login account numbers and similar others.

In step 230, a determination is made whether the user elects to re-use previously configured user settings and/or preferences for the security application. In a particular embodiment, the user's election to re-use the user settings is received as a second input from the user. Examples of user preferences and/or settings for security applications may include: 1) a virus scan schedule and a virus definition update for an anti-virus program, 2) a blocked/approved application list, an inbound/outbound firewall access setting, and an alert setting for a firewall program, 3) an approved/blocked e-mail address list and junk/spam e-mail filter settings for an anti-spam program, and 4) approved/blocked web sites and personal data protection settings for a privacy service program.

In step 232, in response to determining that the user does not elect to re-use the previously configured user preferences, the user proceeds with the configuration and order entry process to place an order for the IHS. Program control is transferred to step 280 upon placement of the order.

In step 240, in response to determining that the user elects to re-use the previously configured user preferences, the user provides a unique identifier. In a particular embodiment, the unique identifier is used to access the previously configured user preferences. In a particular embodiment, the unique identifier is similar to a vehicle identification number (VIN) for an automobile. For example, the unique identifier may be selected to be a service tag that uniquely identifies a previously purchased IHS by the user. A user specific password may also be provided and included with the unique identifier for added security and authentication.

In step 250, a request for receiving the user preferences corresponding to the unique identifier is provided. In step, 260, in response to the request the user preferences are received. Additional details of the tools and techniques to access the user preferences by providing the unique identifier are described with reference to FIG. 4.

In step 270, the user preferences are stored in the pre-configuration file corresponding to the order entered by the user. In step 280, the pre-configuration file is installed on the IHS as a part of the build-to-order IHS fabrication process.

Various steps described above may be added, omitted, combined, altered, or performed in different orders. In a particular embodiment, the step 230 may be omitted if previously configured user preferences are used as a default selection.

Figure 3:
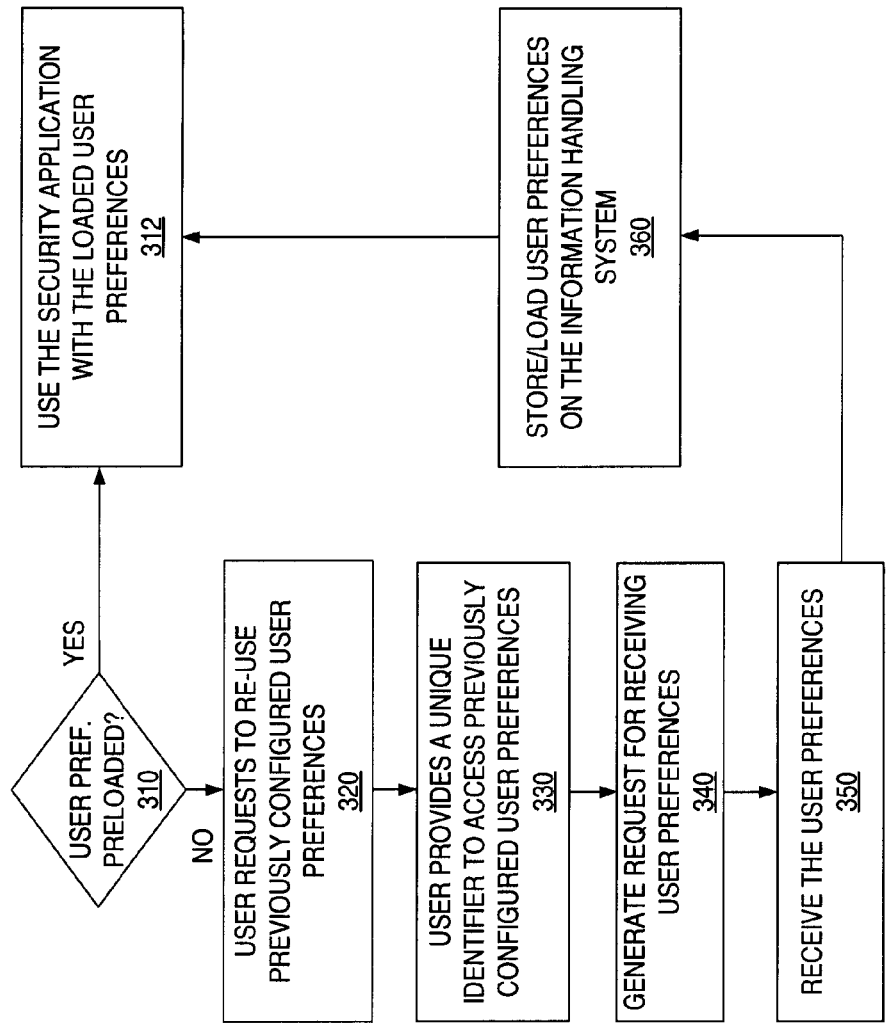
FIG. 3 is a flow chart illustrating a method for configuring a security application loaded on an information handling system (IHS), according to an embodiment.

FIG. 3 is a flow chart illustrating a method for configuring a security application loaded on an information handling system (IHS), according to an embodiment. In a particular embodiment, the security application is the same as the security application 160 described with reference to FIG. 1. In step 310, a determination is made whether user preferences for the security application have been pre-loaded on to the IHS. In step 312, in response to determining that the user preferences have been pre-loaded by the manufacturer of the IHS, the user starts using the security application with the previously configured user preferences. In step 320, in response to determining that the user preferences have not been pre-loaded by the manufacturer of the IHS, a request is received from the user to load the previously configured user preferences corresponding to the user and the security application.

In step 330, the user provides a unique identifier to enable access the previously configured user preferences. In a particular embodiment, the unique identifier is substantially the same as the unique identifier described with reference to step 240 of FIG. 2. A user specific password may also be provided and included with the unique identifier for added security and authentication.

In step 340, a request for receiving the user preferences corresponding to the unique identifier is provided. In step 350, in response to the request the user preferences are received. As described earlier, additional details of the tools and techniques to access the user preferences by providing the unique identifier are described with reference to FIG. 4.

In step 360, the user preferences are stored and loaded on to the IHS 100. Program control is passed on to step 312 for using the security application with the previously configured user preferences.

Various steps described above may be added, omitted, combined, altered, or performed in different orders. In a particular embodiment, a step may be added before steps 330 and 340 to provide encryption for the unique identifier.

Figure 4:
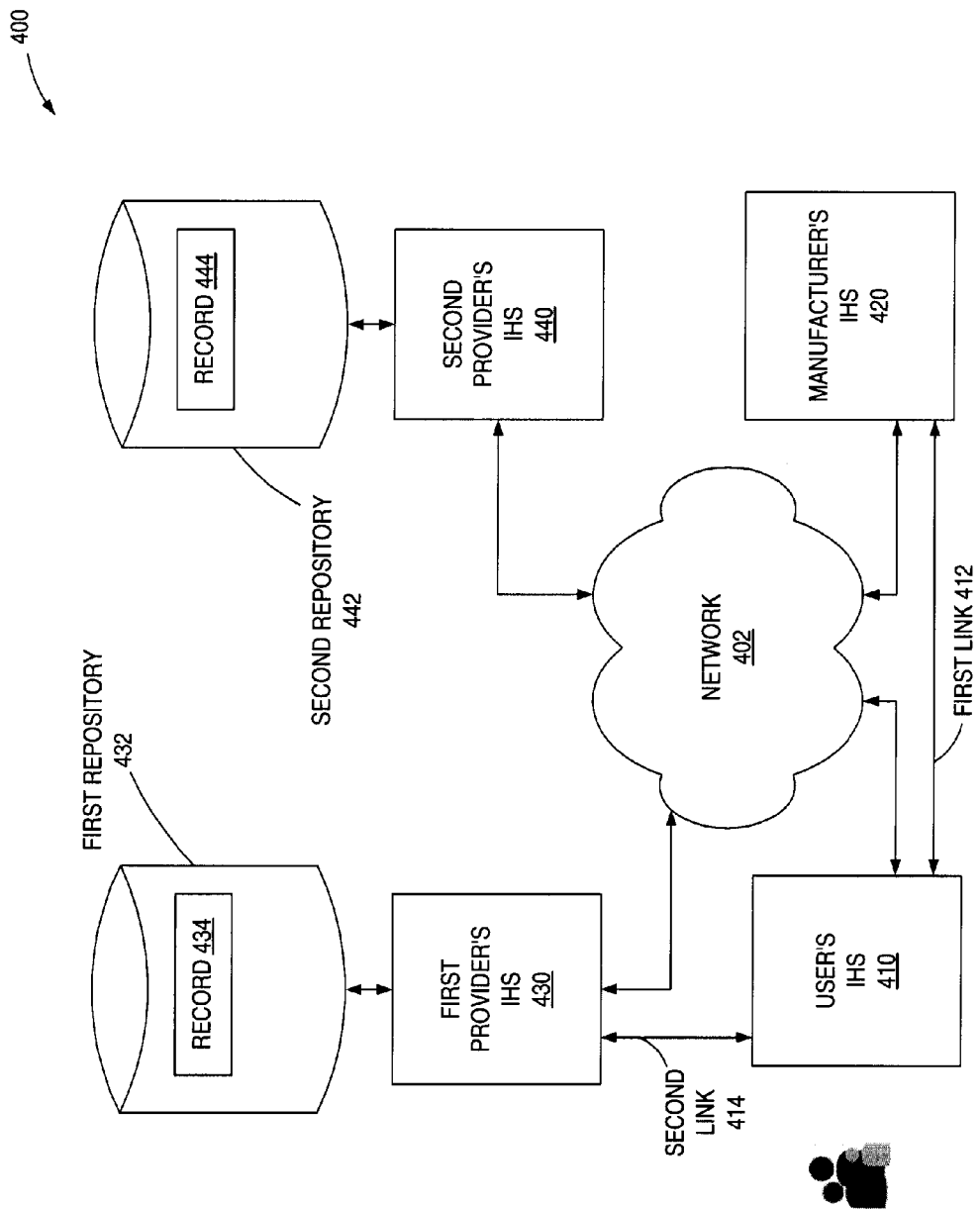
FIG. 4 is a block diagram of a system for accessing user preferences for a security application, according to an embodiment.

FIG. 4 is a block diagram of a system 400 for accessing user preferences for a security application, according to an embodiment. In a particular embodiment, the security application is the same as the security application 160 described with reference to FIG. 1. In the depicted embodiment, the system 400 for accessing user preferences for the security application include a user's information handling system (UISH) 410 coupled to a manufacturer's information handling system (MISH) 420 via a network 402 such as the Internet and/or via a telephone. Similarly, the MISH 420 is coupled to a first provider's information handling system (PISH1) 430 and a second provider's information handling system (PISH2) 440 via a network such as the Internet and/or via a telephone. In an exemplary, non-depicted embodiment, additional provider information handling systems may be included.

The PISH1 430 is coupled to a first repository 432 and the PISH2 440 is coupled to the second repository 442 for storing data/information associated with the security application, such as user preferences. As described herein, a repository (also referred to as a database or an archive) is a memory system having a persistent storage area for storing and maintaining digital information in an accessible form. On purchase of a security application program, a user may set up a security account with a provider, supplier, vendor or manufacturer of the security application program. The setting up of the security account may include providing unique identifying information such as a logon identifier/password, a digital signature, biometric input and similar others.

In an exemplary, non-depicted embodiment, a single information handling system may replace a plurality of the information handling systems provided by the providers of the security application software. That is, one or more providers may offer a common, shared, centralized import/export service or utility to any requester to store/access the user preferences. In this embodiment, each provider may maintain/update their portion of the repository.

In a particular embodiment, the user preferences are stored in records 434 and 444 included in the repositories 432 and 442 respectively in accordance with a predefined format. In an embodiment, the predefined format for the records 434 and 444 is defined in accordance with an extensible markup language (XML). In another embodiment, an alternative language may be used to predefine the format for the records 434 and 444. An XML program generally enables programmers to define their own tags and their own document structure to create customized tags, thereby enabling the definition, transmission, validation, and interpretation of data between various applications and/or between various providers. The predefined format may include a tag and/or object identifier and a plurality of attributes corresponding to the tag identifier. Additional detail of the predefined format is described with reference to FIG. 5.

In a particular embodiment, a user may store previously configured user preferences for a particular information handling system as one of the records 434 or 444 by assigning a unique tag and/or object identifier for the user preferences. The previously configured user preferences may be accessed by the user to transfer the saved user preference data to another substantially similar security application executing on another information handling system. In an embodiment, the unique tag may include a service tag as described with reference to step 240 of FIG. 2 and step 330 of FIG. 3 for the particular information handling system. Because multiple users may use the particular information handling system, additional identifying information such as a user password may be included to uniquely store/access the user preferences.

The system 400 thus advantageously provides a structure and/or a framework for sharing user preferences of security applications across multiple information handling systems and across disparate security applications. Specifically, the predefined format provides a common, shared technique for reading and writing data to records such as 434 and 444. Thus, any authenticated requester such as a user, a program (including disparate security applications) and/or an information handling system is operable to read and write the records such as 434 and 444 containing the user preferences by providing proper authentication and by using predefined commands such as import/export instructions. In a particular embodiment, legacy security applications may be modified to support import/export of user preference data in accordance with the predefined format. In an embodiment, transfer of user preferences may occur via computer readable media such as a hard disk drive, optical media such as CD's and DVD's, and transmission-type media such as digital and analog communications links.

In a particular embodiment, the system 400 supports peer-to-peer communications between any two IHS systems such as between the UISH 410 and the MISH 420 without using the network 402. In the depicted embodiment, a first link 412 couples the UISH 410 and the MISH 420 and a second link 414 couples the UISH 410 and the PISH 430. Although not shown, additional links may be supported. Thus, any two IHS systems may directly exchange and/or share record information such as the records 434 and 444 using proper authentication tools and techniques.

FIG. 5 illustrates an exemplary XML source code for storing user preferences in a record, according to an embodiment. In the depicted embodiment, a firewall record 510 includes user preferences/rules for execution of the Internet explorer program and a uniform resource locator (URL) record 520 lists user preferences for Internet web sites. In a particular embodiment, the record 510 and the record 520 is substantially the same record 434 and the record 444 described with reference to FIG. 4.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. Accordingly, it is appropriate that the appended claims be construed broadly and in a manner consistent with the scope of the embodiments disclosed herein.

What is claimed is:

1. A method for configuring a security application, the method comprising:
    beginning an on-line IHS configuration process through the Internet between a first user information handing system (IHS) and a manufacturer IHS;
    receiving, by the manufacturer IHS through the Internet from the first user IHS, a first input from a user that comprises a security application selected for installation on a second user IHS,
    receiving, by the manufacturer IHS through the Internet from the first user IHS, a second input from the user that comprises a request to retrieve user security preferences that were configured by the user prior to the receiving of the second input and load those user security preferences on the second user IHS as part of the installation of the security application on the second user IHS;
    receiving, by the manufacturer IHS through the Internet from the first user IHS, a unique identifier from the user;
    retrieving, by the manufacturer IHS from a data storage repository, the user security preferences using the unique identifier; and
    installing, by the manufacturer IHS, the security application on the second user IHS, wherein the installing comprises loading the user security preferences.

2. The method of claim 1 further comprising:
    preparing a pre-configuration file by the manufacturer IHS corresponding to an order for the second user IHS entered by the user through the Internet from the first user IHS, wherein the pre-configuration file includes the user security preferences.

3. The method of claim 2, further comprising:
    installing, by the manufacturer IHS, the pre-configuration file on the second user IHS being fabricated corresponding to the order, wherein the user security preferences are loaded on the second user IHS during the installing of the pre-configuration file.

4. The method of claim 1, wherein the user security preferences are stored by the manufacturer IHS in a repository in accordance with a predefined format, and wherein each of a plurality of disparate security applications support the predefined format in order to allow the user security preferences to be imported into any of the plurality of disparate security applications.

5. The method of claim 4, wherein the predefined format is defined in accordance with an extensible markup language (XML).

6. The method of claim 4, wherein the predefined format includes a tag identifier and a plurality of attributes corresponding to the tag identifier, wherein the unique identifier includes the tag identifier.

7. The method of claim 4, wherein the user security preferences stored in the predefined format are accessible to any requester providing the unique identifier.

8. The method of claim 1, wherein the user security preferences are provided by a provider of the security application in response to the requesting.

9. The method of claim 1, wherein the unique identifier is a service tag, wherein the service tag uniquely identifies an information handling system purchased by the user.

10. An information handling system (IHS) comprising:
    a processor;

a memory coupled to the processor for storing a plurality of instructions executable by the processor to configure a security application, wherein the plurality of instructions are executable for:

beginning an on-line IHS configuration process through the Internet between a first user information handing system (IHS) and a manufacturer IHS;

receiving, by the manufacturer IHS through the Internet from the first user IHS, a first input from a user that comprises a security application selected for installation on a second user IHS, receiving, by the manufacturer IHS through the Internet from the first user IHS, a second input from the user that comprises a request to retrieve user security preferences that were configured by the user prior to the receiving of the second input and load those user security preferences on the second user IHS as part of the installation of the security application on the second user IHS;

receiving, by the manufacturer IHS through the Internet from the first user IHS, a unique identifier from the user;

retrieving, by the manufacturer IHS from a data storage repository, the user security preferences using the unique identifier; and installing, by the manufacturer IHS, the security application on the second user IHS, wherein the installing comprises loading the user security preferences.

11. The system of claim 10, wherein the user security preferences are stored in accordance with a predefined format in a repository coupled to the IHS, and wherein each of a plurality of disparate security applications support the predefined format in order to allow the user security to be imported into any of the plurality of disparate security applications.

12. The system of claim 11, wherein the predefined format is defined in accordance with an extensible markup language (XML).

13. The system of claim 11, wherein the predefined format includes a tag identifier and a plurality of attributes corresponding to the tag identifier, wherein the unique identifier includes the tag identifier.

14. The system of claim 11, wherein the user security preferences stored in the predefined format are accessible to any requester providing the unique identifier.

15. The system of claim 10, wherein the unique identifier is a service tag, wherein the service tag uniquely identifies an information handling system purchased by the user.

* * * * *